United States Patent
Miyamoto et al.

(10) Patent No.: US 8,507,825 B2
(45) Date of Patent: Aug. 13, 2013

(54) BONDING METHOD OF DISSIMILAR MATERIALS MADE FROM METALS AND BONDING STRUCTURE THEREOF

(75) Inventors: Kenji Miyamoto, Yokosuka (JP); Shigeyuki Nakagawa, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 13/248,141

(22) Filed: Sep. 29, 2011

(65) Prior Publication Data

US 2012/0021239 A1     Jan. 26, 2012

Related U.S. Application Data

(62) Division of application No. 12/049,758, filed on Mar. 17, 2008, now Pat. No. 8,058,584.

(30) Foreign Application Priority Data

Mar. 30, 2007 (JP) ................................ 2007-092461
Nov. 28, 2007 (JP) ................................ 2007-307345

(51) Int. Cl.
    *B23K 11/11*     (2006.01)
(52) U.S. Cl.
    USPC .......... 219/118; 219/91.2; 219/92; 219/117.1
(58) Field of Classification Search
    USPC ............. 219/78.01, 86.1, 91.2, 91.22, 117.1, 219/118
    See application file for complete search history.

(56) References Cited

U.S. PATENT DOCUMENTS 5,302,797 A * 4/1994 Yasuyama et al. ............ 219/118

FOREIGN PATENT DOCUMENTS

| JP | 54-058656 | 5/1979 |
|----|-----------|--------|
| JP | 59-218283 | 12/1984 |
| JP | 64-066076 | 3/1989 |
| JP | 04-055066 | 2/1992 |
| JP | Hei 04-127973 | 4/1992 |
| JP | Hei 06-007952 | 1/1994 |
| JP | 06-087079 | 3/1994 |
| JP | 09-057459 | 3/1997 |
| JP | 2000-094141 | 4/2000 |
| JP | 2002-035955 | 2/2002 |
| JP | 2003-071569 A | 3/2003 |
| JP | 2003-164975 | 6/2003 |
| JP | 2005-152958 | 6/2005 |
| JP | 2006-175502 | 7/2006 |
| JP | 2006-198679 | 8/2006 |
| JP | 2006-326612 | 12/2006 |

OTHER PUBLICATIONS

Machine Translation of JP 06-055278A, 1994.*

* cited by examiner

*Primary Examiner* — Brian Jennison
(74) *Attorney, Agent, or Firm* — Young Basile

(57) ABSTRACT

Disclosed is a bonding method for dissimilar materials made from metals and its resulting structures. The materials to be bonded are formed by layering three or more sheets such that a dissimilar material interface and a same material interface are formed. A first current is conducted between a three-sheet layered plate material wherein an aluminum alloy plate, a zinc plated steel plate and a bare steel plate, for example, are layered in order. A nugget is formed in an interface between the zinc plated steel plate and the bare steel plate, which are the same materials. Then, a second current greater than the first current is conducted, and a nugget is formed in an interface between the aluminum alloy plate and the zinc plated steel plate.

8 Claims, 7 Drawing Sheets

BONDING METHOD OF DISSIMILAR MATERIALS MADE FROM METALS AND BONDING STRUCTURE THEREOF

CROSS-REFERENCE TO RELATED APPLICATIONS

This application is a divisional of U.S. patent application Ser. No. 12/049,758, filed Mar. 17, 2008, which claims priority from Japanese Patent Application Serial No. 2007-092461, filed Mar. 30, 2007, and Japanese Patent Application Serial No. 2007-307345, filed Nov. 28, 2007, each of which is incorporated herein in its entirety by reference.

TECHNICAL FIELD

The invention relates to bonding techniques and resulting structures using resistance welding of dissimilar metallic materials such as steel material, aluminum alloy material, and the like. In particular, the invention relates to a bonding wherein the materials are formed by layering three or more sheets and have a dissimilar material interface and a same material interface.

BACKGROUND

When bonding dissimilar metals, if the bonding process used is the same as that used for bonding the same materials, then sufficient seam strength cannot be obtained since a weak intermetallic compound is formed. For example, when an aluminum alloy and a steel material are bonded, weak intermetallic compounds having high hardness such as $Fe_2Al_5$ or $FeAl_3$ are formed. It is necessary to control such intermetallic compounds so as to secure the seam strength.

However, a fine and rigid oxide coating is formed on a surface of the aluminum alloy. To remove such a coating, it is necessary to provide a large amount of heat at the time of the bonding operation. As such, a thick intermetallic compound layer grows, which may then cause a problem as the strength of the bonded portion becomes weak.

Thus, when using a combination of such dissimilar metallic materials, the dissimilar materials have been traditionally bonded through a mechanical fastening operation by means of a bolt, rivet, etc. However, this results in an increase of weight or cost. For the bonding operation of such dissimilar metals, a friction pressure bonding is utilized in some components. However, such a friction pressure bonding operation is limitedly used in a bonding operation between rotation bodies having a desired symmetry, etc. Thus, its application is quite limited. Bonding operations such as explosion bonding or hot rolling are well known. However, such operations have facility and efficiency problems, making it difficult to broadly apply such operations to conventional dissimilar metals.

Japanese Laid-Open Patent Publication No. (Hei) 4-127973 discloses a method of performing a resistance welding operation with a current conducting time equal to or less than 10 ms. Such a method is performed when a clad material formed of two types of materials that are same as the dissimilar metals is interposed between the dissimilar metallic materials to be bonded. This is so that the same materials are bonded to each other.

However, in this method, three sheets of the plates are required where two sheets of the plates would have been required. When considering actual manufacturing, fixating the clad material is required in addition to inserting the clad material. Further, new equipment should be assembled in an established welding line, thereby causing a cost increase.

Moreover, when bonding aluminum and steel, since the aluminum clad steel itself is manufactured by bonding the dissimilar materials to each other, manufacturing conditions become critical. Thus, it is difficult to obtain a cheap clad material with a stable performance.

Japanese Laid-Open Patent Publication No. (Hei) 6-39558 discloses a method of bonding materials comprising plating aluminum alloy having Al content equal to or more than 20 wt % or pure aluminum on a surface of the steel, contacting the steel with the aluminum material such that the aluminum alloy or pure aluminum has a thickness equal to or more than 2 μm, conducting the current by layering such a plating surface on the aluminum material, preferably fusing the plating layer and hardly fusing the steel material side.

This aluminum plating operation requires a large amount of heat in order to destroy a rigid oxide coating on the surface of the steel at the time of bonding the aluminum plating surface and the aluminum material. Thus, a weak intermetallic compound is formed on an interface between the aluminum plate and the steel, increasing the likelihood that the bond will fail.

When resistance welding three or more sheets of dissimilar material, both the dissimilar material interface and the same material interface are present at the same time. When the resistance heating of the dissimilar material interface is less than the resistance heating of the same material interface, a nugget is formed on the same material interface due to the difference in the resistance heating, while hardly forming on the dissimilar material interface. In such a case, in order to obtain sufficient bonding strength in each of the interfaces, it is necessary to provide enough heat for the nugget to have the desired diameter on the dissimilar material interface side. However, when the necessary heat is provided to produce a large enough nugget on the dissimilar material interface, the resistance heating in the same material interface becomes excessive. Thus, the thickness decreases by such a resistance heating in a low melting point side material, i.e., the aluminum material side in the above-mentioned bonding example of the aluminum and the steel.

BRIEF SUMMARY

Disclosed herein are methods of bonding dissimilar materials made from metals. One such method includes layering a plurality of plate materials, wherein at least two of the plate materials are a first metallic material and at least one plate material is a second metallic material having a melting point lower than the first metallic material, to form a dissimilar material interface and a same material interface, forming a layered seam by a resistance welding operation in which a contact resistance of the dissimilar material interface is lower than a contact resistance of the same material interface, conducting a first current across at least three layers of the plurality of layered plate materials to form a nugget in the same material interface and conducting a second current greater than the first current across the at least three layers of the plurality of layered plate materials to form a nugget in the dissimilar material interface.

Also disclosed are bonded structures of dissimilar materials made from metals. One such structure includes, by example, at least two plates layers of a first metallic material, at least one plate layer of a second metallic material having a melting point lower than the first metallic material, a dissimilar material interface between a plate layer of the first metallic material and a plate layer of the second metallic material, a same material interface between adjacent plate layers of the first metallic material, wherein a contact resistance in the dissimilar material interface is lower than a contact resistance in the same material interface, a nugget formed in the dissimilar material interface having a first diameter and a nugget formed in the same material interface having a second diameter, wherein the first diameter is equal to or larger than the second diameter.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Bonding methods disclosed herein are capable of sufficiently securing the bonding strength in each of the interfaces, wherein a desired nugget diameter can be formed in each interface while inhibiting a decrease in thickness of the material at a low melting point side. The methods can be utilized when three or more sheets of dissimilar materials made from metals are layered and bonded by the resistance welding operation. The methods can also be utilized for a combination of the materials that has both the same material interface and the dissimilar material interface and in which a resistance heating in the dissimilar material interface becomes smaller than that in the same material interface due to the contact resistance difference between both interfaces. Also disclosed is a bonding structure obtained by such bonding methods. The bonding structure is, for example, a component of a vehicle such as a door, hood, etc.

The invention is explained based on the embodiments below, although the present invention is certainly not limited to these embodiments.

The bonding method of the dissimilar metals according to the invention herein relates to a layering bonding of three or more sheets of metallic plate materials by a resistance welding operation, wherein the metallic plate materials have a dissimilar material interface and a same material interface. The contact resistance in the dissimilar material interface is lower than the contact resistance in the same material interface. A specific combination of such dissimilar metallic materials may include, for example, combinations of a steel-steel-aluminum alloy material and a steel-steel-magnesium alloy material.

As used herein, the term "same material" means a material having the same component system or the same metallic structure. However, such a term is not limited to a material belonging to the same standard. For example, in the case of a steel material, although the material may belong to a separate standard such as carbon steel and alloy steel or soft steel, tensile strength steel, etc., they are considered to be the same material as long as the materials have the ferrite structure.

As used herein, the term "same material interface" means a bonding interface of the same materials, while the term "dissimilar material interface" means a bonding interface of the dissimilar materials.

Figure 1A:
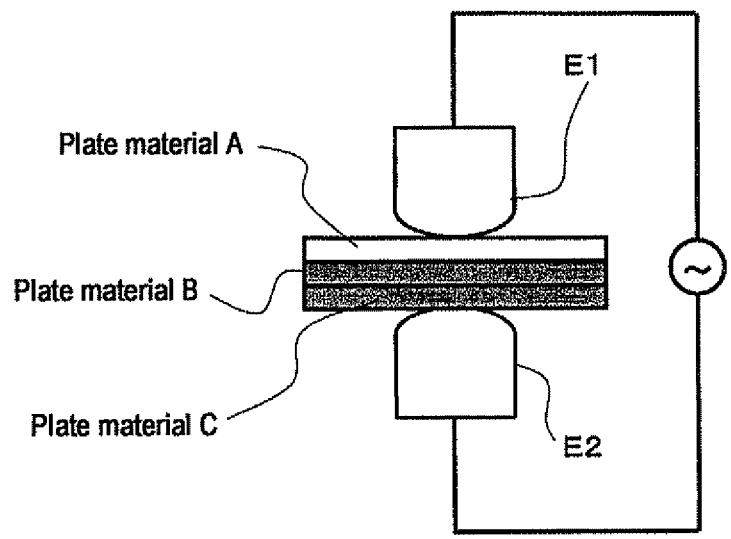
FIGS. 1A and B are overall views of a resistance welding apparatus in an AC power type and a resistance welding apparatus comprising a monitoring device of contact resistance, respectively.

In one embodiment of the bonding method for the dissimilar metals, a spot welding device of an AC power type is used as shown in FIG. 1A. In FIG. 1A, the layering welding operation is performed by pressing and conducting the current to three sheets of plate materials A, B and C (B and C are the same materials) by one welding electrode E1 and E2.

In this bonding method for dissimilar metals, a nugget is formed in the same material interface by conducting a relatively low first current between the layered materials and then conducting a second current greater than the first.

Because the relatively low current is conducted at an initial process of the bonding operation, the nugget is formed in the same material interface having a greater contact resistance and resistance heating. Also, since the same material interface is bonded, the electrical conduction is secured so that the resistance in the same material interface is decreased. As such, since the resistance heating in the dissimilar material interface becomes sufficient after the nugget is formed in the same material interface, it is possible to form a desired nugget diameter in the dissimilar material interface.

Figure 1B:
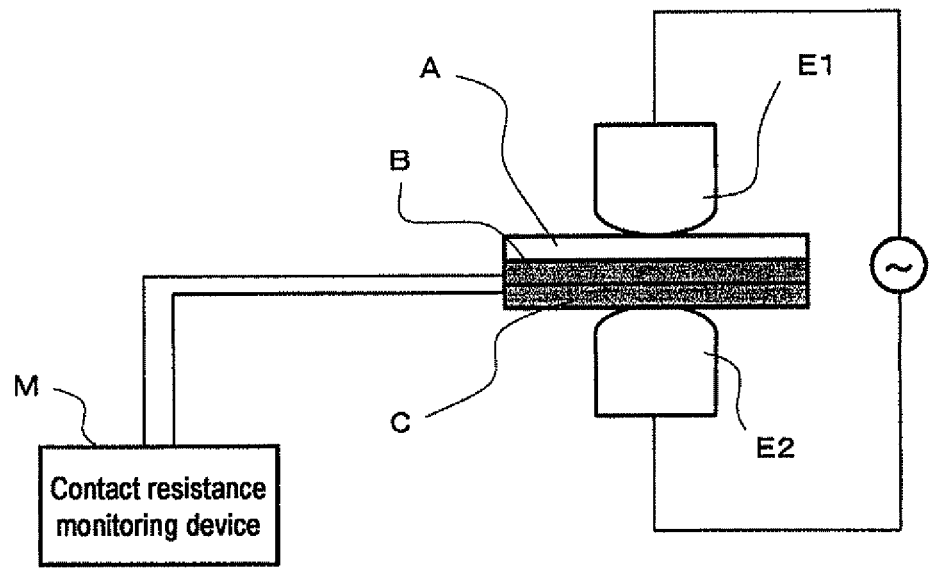

At this time, as shown in FIG. 1B, the bonding operation can be performed while monitoring the contact resistance in the same material interface in the layered plate material. This is done by using a contact resistance monitoring device having an ammeter or a voltmeter for monitoring the contact resistance and switching the first current to the greater second current according to a resistance value change in the same material interface.

Although not illustrated, the first current may be switched to the second current by monitoring the contact resistance between the plate material A and the plate material C in FIG. 1B. Because the contact resistance between the plate material B and the plate material C is greater than the contact resistance between the plate material A and the plate material B, the contact resistance in the same material interface can be decreased by monitoring the contact resistance decrease between the plate material A and the plate material C.

The contact resistance in the dissimilar material interface as well as the contact resistance in the same material interface may be monitored. The first current may be switched to the greater second current when the contact resistance in the same material interface becomes equal to the contact resistance in the dissimilar material interface.

In this bonding method embodiment, the resistance heating difference is reduced at the time of conducting the current so that a balance between the contact resistances in the dissimilar material interface and the same material interface becomes favorable. To achieve this, a surface roughness in at least one plate material side forming the dissimilar material interface can be greater than that of any of the plate material surfaces forming the same material interface. Alternatively, a surface roughness in at least one plate material side forming the same material interface is finer than any of the plate material surfaces forming the dissimilar material interface.

For example, a method of roughing the plate material surface may include a rubbing operation by a rasp having a rough texture, an etching operation or shot blast operation. Further, to improve the degree of surface roughness, meaning making the surface finer and smoother, a grind polishing operation or buff polishing operation may be considered as a finishing process.

Also, for the same object, a material for increasing the electrical resistance of the dissimilar material interface can be interposed in the dissimilar material interface. More specifically, an alumina paste may be applied to the interface, or a carbon material, ceramics or a conductive resin may be interposed.

In the bonding methods taught herein, a seal material may be interposed in the dissimilar material interface. The corrosion resistance of the dissimilar materials can be improved by preventing electrical corrosion resulting from a direct contact of the dissimilar metals. Additionally, the resistance heating in the dissimilar material interface is enhanced so that expansion of the nugget diameter at the interface occurs.

In addition, a third metallic material can be interposed in the dissimilar material interface wherein the third metallic material eutecticly fuses, or causes a eutectic fusion, with at least one side of the dissimilar metallic materials forming the interface. By doing so, although a rigid oxide coating is formed on the bonding surface, such a coating can be easily discharged from the bonding interface.

Figure 2:
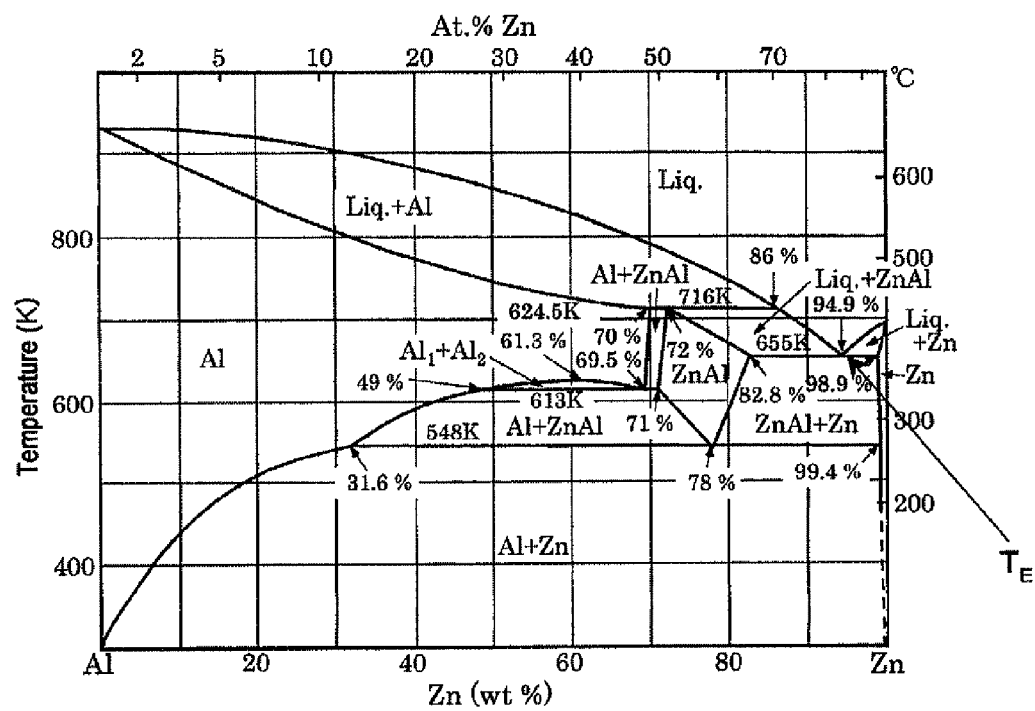
FIG. 2 is a graph showing a binary phase diagram of an Al—Zn system.

FIG. 2 shows a binary phase diagram of an aluminum-zinc (Al—Zn) system as an example of an alloy wherein the eutectic reaction occurs. As shown in FIG. 2, a eutectic point Te in the Al—Zn system is 655K and the eutectic reaction occurs at a temperature even lower than a melting point 933K of Al.

As such, a lower temperature bonding operation can be performed if the eutectic fusion of Al and Zn occurs at the eutectic points shown in FIG. 2 and then the eutectic fusion is used for the bonding operation of the aluminum material as an oxide coating removal or mutual diffusion, etc. Growth in the bonding interface of the metal to intermetallic compounds such as $Fe_2Al_5$ or $FeAl_3$ can thus be effectively suppressed.

As used herein, eutectic fusion means a fusion using the eutectic reaction. When the composition of the mutual expanding region resulting from a mutual expansion of two metals (or alloys) is a eutectic composition, a liquid phase is formed by the eutectic reaction if the maintaining temperature is equal to or higher than the eutectic temperature. For example, for aluminum and zinc, the melting point of the aluminum is 933K and the melting point of the zinc is 692.5K. Further, the eutectic metal is fused at a temperature of 655K, which is lower than each melting point.

Thus, when clean surfaces of both metals are contacted and maintained by heating at a temperature equal to or more than 655K, the eutectic fusion reaction occurs. The eutectic composition becomes Al-95% Zn.

Although the rigid oxide coating exists on the surface of the aluminum material, the coating is physically destructed by the current conducting and pressing operations at the time of the resistance welding operation. That is, because microscopic convex portions on the material surface contact each other during the pressing operation, the eutectic fusion occurs from a portion of the aluminum and zinc that are contacted by local destruction of a part of the oxide coating. Because a liquid phase is formed, the oxide coating therearound is fractured and decomposed. Also, the reaction of the eutectic fusion is expanded to an entire surface so that the oxide coating destruction is enhanced. The bonding operation via liquid phase is accomplished.

Since the eutectic composition is automatically achieved by the mutual diffusion, controlling the composition is not necessary. The eutectic reaction exists at a low melting point between two types of metals or alloys. In the case of the eutectic fusion of the aluminum and zinc, when the Zn—Al alloy is used instead of zinc, it is advantageous if the composition contains zinc equal to or more than 95%.

FIGS. 3A to 3F schematically show bonding processes using eutectic fusion when the seal material is interposed in the dissimilar material interface.

Figures 3A, 3B, 3C, 3D, 3E, 3F:
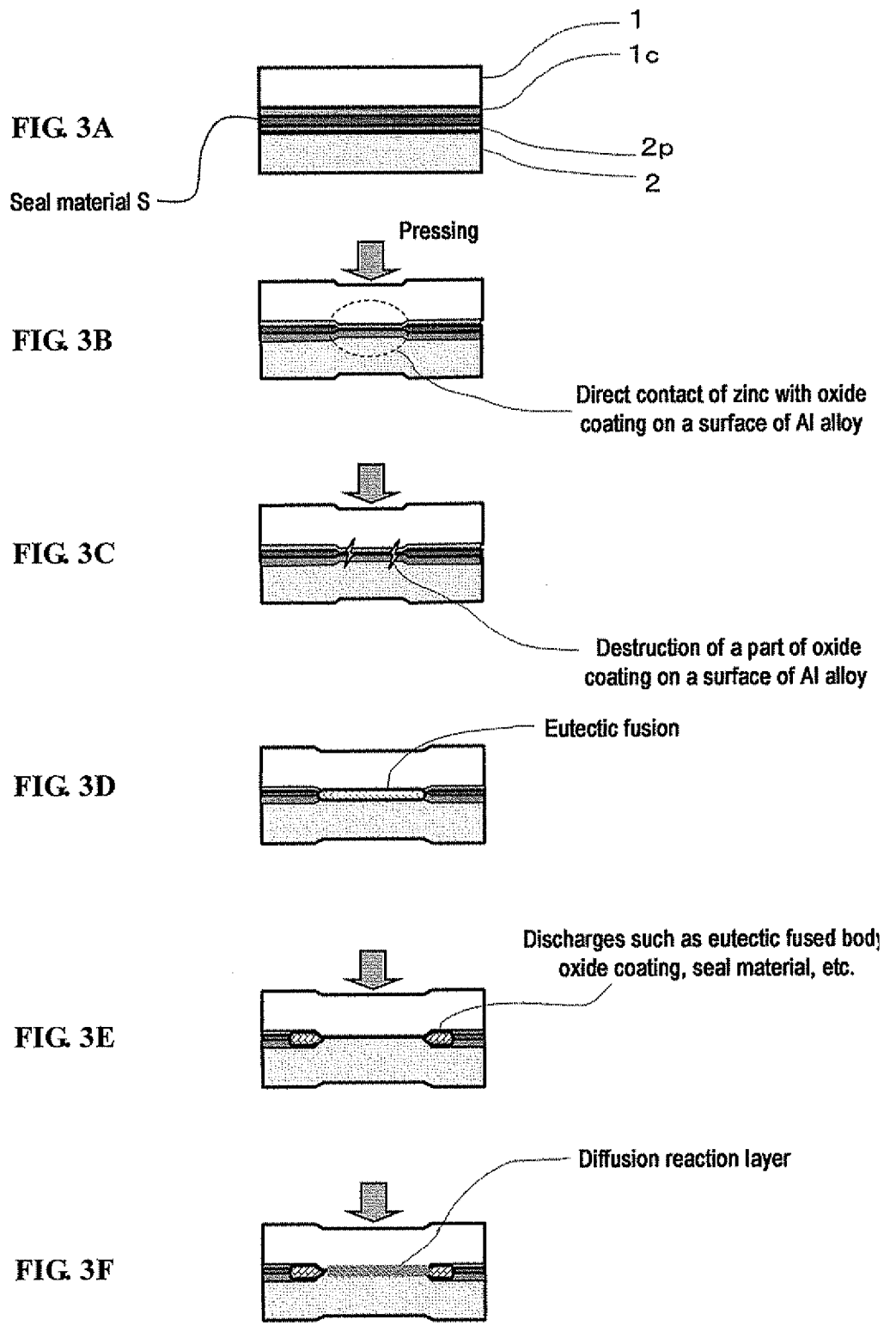
FIGS. 3A to F schematically show a bonding process using a eutectic fusion when a seal material is interposed into a dissimilar material interface.

First, as shown in FIG. 3A, a zinc plated steel plate 2 and an aluminum alloy plate 1 are prepared. A zinc plated layer 2p is provided on the zinc plated steel plate 2 and serves as the third metallic material causing the eutectic operation with Al. The zinc plated steel plate 2 and the aluminum alloy plate 1 are layered such that the zinc plated layer 2p is adjacent the aluminum alloy plate 1. A paste-type seal material S is applied to an interface thereof, and an oxide coating 1c is formed on the surface of the aluminum alloy plate 1.

Next, the materials to be bonded are pressed by a pair of upper and lower welding electrodes as shown in FIG. 3B such that the seal material S is discharged from a center portion of the bonding portion to an outer peripheral portion. At the center portion, the zinc plated layer 2p and the oxide coating 1c on the surface of the aluminum alloy plate 1 directly contact one another.

When a mechanical or thermal impact occurs due to the pressing and current conducting operations as shown in FIG. 3C, the oxide coating is partially destructed. As a result, where zinc and aluminum are locally contacted, and thus a temperature equal or higher than the eutectic point temperatures of zinc and aluminum is maintained as shown in FIG. 3D, then eutectic fusion of zinc and aluminum occurs.

As shown in FIG. 3E, by further pressing the electrodes, the oxide coating 1c or impurities (not shown) in the bonding interface with the eutectic fusion metal are discharged to a surrounding of the bonding portion with the seal material, and a predetermined bonding area is secured. Thereafter, since new surfaces of aluminum and steel are directly bonded to each other as shown in FIG. 3F, a rigid metal bonding operation can be obtained between the zinc plated steel plate 2 and the aluminum alloy plate 1.

The third metallic material to be interposed between both materials is not specifically limited as long as it forms a low melting point eutectic operation with the aluminum alloy. For example, the third metallic material may include copper (Cu), tin (Sn), silver (Ag) or nickel (Ni) in addition to the above-mentioned zinc (Zn).

Such metals with Al cause the eutectic reaction and are fused at a temperature equal to or lower than a melting point of a base material (i.e., aluminum alloy material). Thus, even for the bonding operation of steel and aluminum alloy material that easily forms a weak intermetallic compound, the oxide coating can be removed at a low temperature. Further, the formation of the intermetallic compound on the bonding interface during the bonding procedure can be suppressed so that a rigid bond is formed.

Although the material used herein to explain the operation is primarily a combination of steel and aluminum alloy material, a combination of steel and magnesium alloy material may be considered. When bonding steel and magnesium alloy material, the bonding operation can be performed by causing the eutectic reaction between the zinc plated in the steel side and the magnesium.

The third metallic material is certainly not limited to the pure metal as stated above. However, since the eutectic metal includes a binary alloy and a ternary alloy as well, the third metallic material may include an alloy including any one type of metal among them.

The third metallic material can be interposed by any suitable method. One non-limiting example includes plating the third metallic material on at least one of the bonding surfaces of the materials to be bonded. Where desired or required, it is also contemplated that a material insert can be employed. However, it can be appreciated that the plating process improves operational efficiency by reducing the number of manufacturing processes. Since any particular preparation is not required and conventionally available steel material plated with zinc for corrosion control can be used in situ, it becomes possible to easily and inexpensively perform the rigid bonding operation of the dissimilar metals.

The bonding structure resulting from the disclosed bonding method of the dissimilar metals has three or more sheets of dissimilar metallic materials. When two or more sheets of the plate materials formed of the first metallic material are layered with one or more sheets of the plate material formed of the second metallic material having a melting point lower than the first metallic material, the dissimilar material interface and the same material interface are formed, and the contact resistance in the dissimilar material interface becomes lower than the contact resistance in the same material interface. Further, the strength required in the entire seam structure can be obtained since a nugget having the diameter Dd within a range of $4.4\sqrt{t1}<Dd<12\sqrt{t1}$, or more preferably $5.5\sqrt{t1}<Dd<12t1$, is formed in the dissimilar material interface. Herein, t1 is a thickness of the plate layer having the smaller product, wherein the plate layer is one of the plate layers forming the dissimilar material interface. Herein, the product of a respective plate layer is defined as the strength per unit area multiplied by the thickness of the plate layer. Also, the nugget having the diameter Ds within a range of $4\sqrt{t2}<Ds<7\sqrt{t2}$ is formed in the same material interface. Herein, t2 is a thickness of the plate layer having the smaller product, wherein the plate layer is one of the plate layers forming the same material interface.

When the nugget diameter Dd in the dissimilar material interface and the nugget diameter Ds in the same material interface are equal to or smaller than $4.4\sqrt{t1}$ and $4\sqrt{t2}$, respectively, the bonding strength in each interface may be weak. When the nugget diameters Dd and Ds become equal to or more $12\sqrt{t1}$ and $7\sqrt{t2}$, respectively, the strength is more than that required and forms a larger bonding flange width than necessary. This can increase weight and cost.

Hereinafter, specific embodiments of the invention are explained in detail.

Figure 4A:
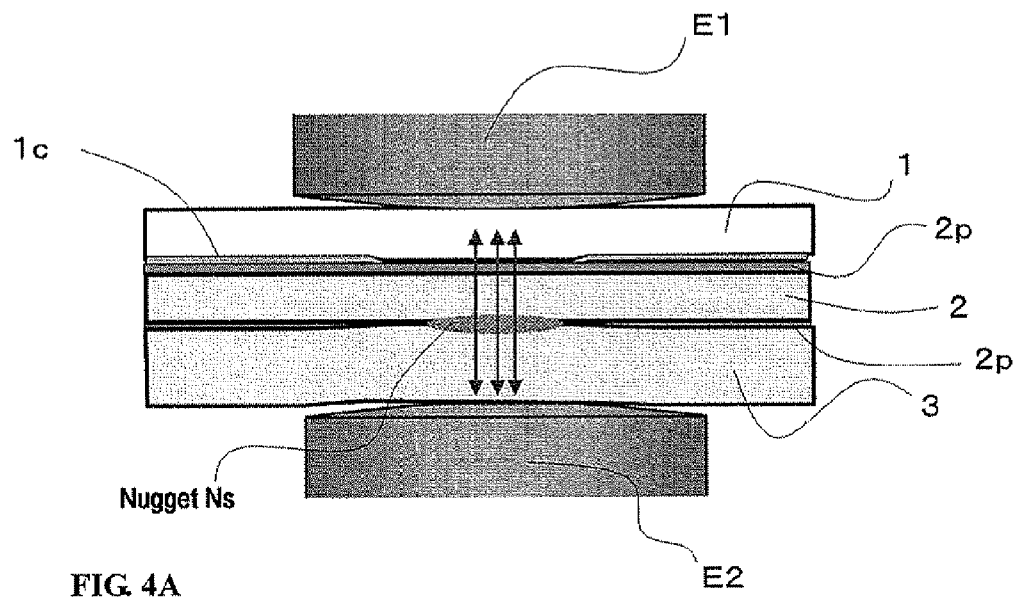
FIGS. 4A and B are cross-sectional explanatory views of first, second and fourth embodiments of a bonding process of a three-sheet bundle.
Figure 4B:
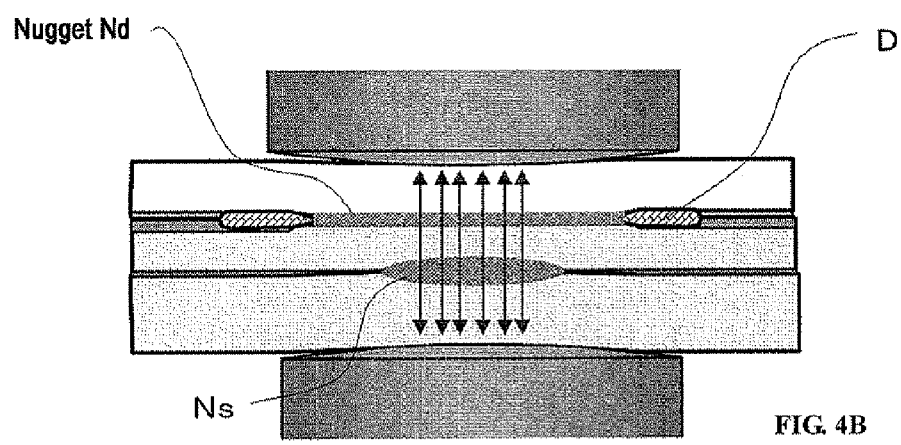

A first embodiment as depicted in FIGS. 4A and 4B is next described. As shown in FIG. 4A, a bonding operation of a three-sheet bundle is performed wherein a 6000 system aluminum alloy plate 1 having a thickness of 1.0 mm, a zinc plated steel plate 2 having a thickness of 0.8 mm and a bare steel plate 3 having a thickness of 1.2 mm are layered in that order. A spot welding device of an AC power type having a contact resistance monitoring device as shown in FIG. 1B is used along with an R-type electrode having a radius of curvature of a leading end curved surface of 40 mm as the electrodes E1 and E2.

To form the nugget Ns in the same material interface (i.e., the interface between the zinc plated steel plate 2 and the bare steel plate 3), a pressing force of 300 kgf is applied and an AC current of 4000 A is conducted while continuously monitoring the contact resistance of the same material interface with monitoring device M. When the contact resistance of the same material interface is reduced to a value of 20% of a previously metered and stored primary contact resistance value, the AC current is increased to a value of 22000 A. Then, the AC current is conducted for a total period of 0.16 second. As shown in FIG. 4B, the nugget Nd is formed in the dissimilar material interface, i.e., the interface between the aluminum alloy plate 1 and the zinc plated steel plate 2.

By performing the resistance welding operation with such a current conducting pattern, the heating is suppressed in the dissimilar material interface when the initial contact resistance difference is great. Since heat is lacking in the initial lower current, a nugget is not formed in the dissimilar material interface while the nugget Ns is formed in the same material interface. When the current is switched to a current greater than the initial low current, since a part of the same material interface is bonded, the electrical resistance of the interface decreases. Thus, when suppressing the heating of the same material interface, the nugget Nd can be formed in the dissimilar material interface.

As such, it is possible to inhibit the thickness decrease of the aluminum alloy plate 1 due to the heating of the same material interface as well as to obtain a favorable bonding seam by allowing the nugget diameter in both interfaces to have an appropriate size.

As a result, the nugget Ns having a diameter Ds=5 mm is formed in the same material interface, while the nugget Nd having a diameter Dd=7 mm is formed in the dissimilar material interface. Moreover, a discharge D, including impurities of the fusion eutectic metal, oxide coating or bonding interface, is extruded in a surrounding thereof.

In the present embodiment, the zinc plated steel plate 2 is used. Thus, a eutectic fusion of zinc and aluminum as a third metallic material is effectively operated. As such, it is possible to remove the oxide coating on the surface of the aluminum alloy plate 1 at a low temperature. This is to implement the contact of new surfaces of the dissimilar material interface at a lower temperature and to obtain a bonding joint having a high strength since a thin and uniform Fe—Al diffusing reaction layer (a compound layer) is formed.

In a second embodiment, as in the first embodiment, the bonding operation of a three-sheet bundle is performed wherein a 6000 system aluminum alloy plate 1 having a thickness of 1.0 mm, a zinc plated steel plate 2 having a thickness of 0.8 mm and a bare steel plate 3 having a thickness of 1.2 mm are layered in that order. At this time, the surface of the aluminum alloy plate 1 forming the dissimilar material interface is ground by emery No. 80 so that it becomes rougher than the surfaces of the zinc plated steel plate 2 and the bare steel plate 3 forming the same material interface. This causes the initial contact resistance of the dissimilar material interface to become equal to the contact resistance of the same material interface.

Except for making the initial current to be 6000 A by using the spot welding device shown in FIG. 1B, the same operations as described above are repeated. A nugget Ns having a diameter Ds=5 mm is formed in the same material interface, and a nugget Nd having a diameter of Dd=7 mm is formed in the dissimilar material interface.

By further roughening a surface of the dissimilar material interface, the contact resistance of the dissimilar material interface is increased, and the resistance heating in the dissimilar material interface is increased. This enhances the nugget to be formed in the dissimilar material interface. Further, by inhibiting the decrease in thickness of the aluminum alloy plate 1 resulting from the heat transfer of the resistance heating in the same material interface, nuggets having the appropriate shapes and sizes are formed. Also, a favorable bonding seam can be obtained in addition to the effects of the eutectic fusion.

Figure 5A:
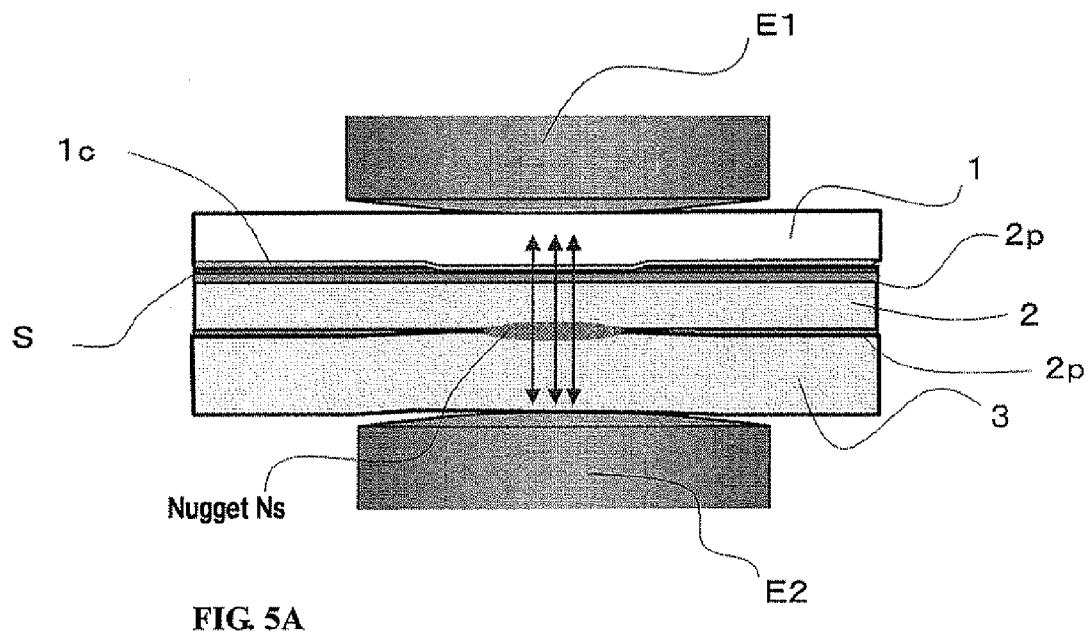
FIGS. 5A and B are cross-sectional explanatory views of a third embodiment of the bonding process of a three-sheet bundle wherein a seal material is interposed in a dissimilar material interface.
Figure 5B:
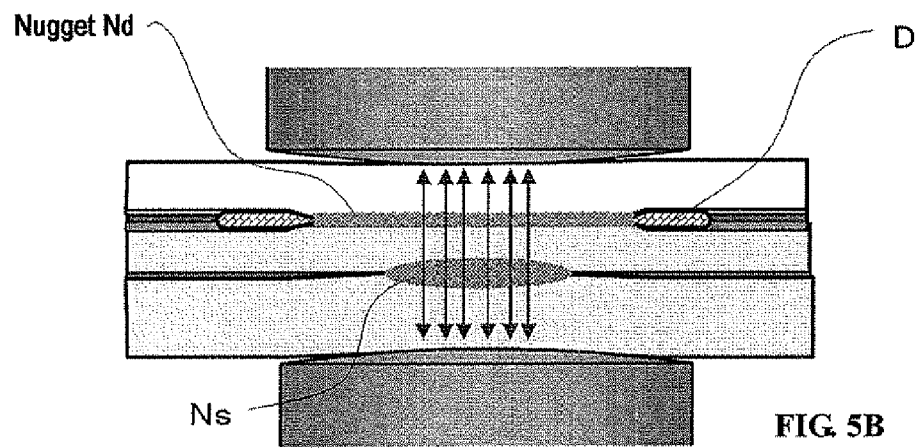

A third embodiment is shown in FIG. 5A. The bonding operation of a three-sheet bundle is performed wherein a 6000 system aluminum alloy plate 1 having a thickness of 1.0 mm, a zinc plated steel plate 2 having a thickness of 0.8 mm and a bare steel plate 3 having a thickness of 1.2 mm are layered in that order. Further, a seal material S formed of thermosetting resin in an epoxy system is arranged in an interface of the aluminum alloy plate 1 and the zinc plate steel plate 2.

Except for exerting a pressing force of 450 kgf by using the spot welding device shown in FIG. 1B, the same operations as in the first embodiment are repeated. A nugget Ns having a diameter Ds=5 mm is formed in the same material interface, and a nugget Nd having a diameter of Dd=8 mm is formed in the dissimilar material interface.

The seal material S is inserted and held between the dissimilar materials, preventing electric corrosion resulting from direct contact of the dissimilar materials. The resistance heating in the dissimilar material interface is increased by the electric resistance of the seal material, thereby enhancing the nugget to be formed in the dissimilar material interface. Further, a favorable bonding seam can be obtained by inhibiting the decrease in thickness of the aluminum alloy plate 1, while smoothly discharging the oxide coating of the aluminum from the bonding interface. Nuggets are formed having appropriate shapes and sizes in the dissimilar material interface and the same material interface.

In a fourth embodiment, as in the first embodiment, the bonding operation of a three-sheet bundle is performed wherein a 6000 system aluminum alloy plate 1 having a thickness of 1.0 mm, a zinc plated steel plate 2 having a thickness of 0.8 mm and a bare steel plate 3 having a thickness of 1.2 mm are layered in that order. At this time, to increase the contact resistance of the dissimilar material interface, alumina paste is thinly applied on the bonding surface of the aluminum alloy plate 1.

Except for allowing the initial current to be 6000 A by using the spot welding device shown in FIG. 1B, the same operations as in the first embodiment are repeated. A nugget Ns having a diameter Ds=5 mm is formed in the same material interface, and a nugget Nd having a diameter of Dd=7 mm is formed in the dissimilar material interface.

Since alumina is interposed in the dissimilar material interface in this embodiment, the electric resistance between the aluminum alloy plate 1 and the zinc plated steel plate 2 is increased along with the resistance heating. As such, this enhances the nugget to be formed in the interface. Also, as in each embodiment, the oxide coating can be smoothly discharged by an operation of eutectic fusion based on the interposition of the zinc plated layer 2p, and a favorable bonding seam can be obtained.

To exemplify the improved bonding of dissimilar materials, a first comparison example is described. As in the first embodiment, the bonding operation of a three-sheet bundle is performed wherein a 6000 system aluminum alloy plate 1 having a thickness of 1.0 mm, a zinc plated steel plate 2 having a thickness of 0.8 mm and a bare steel plate 3 having a thickness of 1.2 mm are layered in that order.

The bonding operation is performed by using the spot welding device of the AC power type shown in FIG. 1A and the same electrodes E1 and E2 as above so that a nugget in the same material interface becomes an appropriate size. An AC current having 12000 A is conducted for 0.16 second while exerting a pressing force of 240 kgf.

As a result, a nugget Ns having a diameter Ds=6 mm is formed in the same material interface, and a nugget Nd having a diameter Dd=3 mm is formed in the dissimilar material interface.

For further comparison, a second comparison example is described. When performing the bonding operation of a three-sheet bundle as in the first comparison example, the same operations as in the first comparison example are repeated except for the following. So that the nugget in the dissimilar material interface becomes an appropriate size, an AC current having 22000 A is conducted for 0.16 second while exerting a pressing force of 240 kgf. This is so that the dissimilar metal bonding seam of the present example is obtained.

As a result, a nugget Ns having a diameter Ds=8 mm is formed in the same material interface. However, in the dissimilar material interface, a nugget is formed in one end. Accordingly, since the thickness decrease occurs in the aluminum alloy plate 1, the aluminum alloy plate 1 is deposited on the electrode E1. Further, an aperture is formed in the aluminum alloy plate 1 so that an appropriate nugget is not formed in the dissimilar material interface.

As for the first to fourth embodiments and the first and second comparison examples, the comparison results of the nugget-forming states in each interface or the thickness decrease states of the materials to be bonded are indicated in Table 1 below.

As the results indicate, in the first to fourth embodiments, the sizes of the nuggets are appropriate in the same material interface and the dissimilar material interface, and no thickness decrease occurs. On the other hand, in the first comparison example, although the appropriate nugget is formed in the same material interface, the nugget having an appropriate size is not formed in the dissimilar material interface due to the lack of heating. Further, in the second comparison example, it is proven that if a current sufficient for forming the nugget having an appropriate size in the dissimilar material interface is applied, the thickness of the aluminum alloy plate is decreased such that a favorable bonding seam cannot be obtained.

TABLE 1

| | | | Nugget generation state | | |
| --- | --- | --- | --- | --- | --- |
| Division | Material combination | Current change | Dissimilar material interface | Same material interface | Thickness decrease state |
| First Comparison Example | 6000 system Al alloy + Zinc plated steel plate + bare steel plate | No (Low Current) | Little | Appropriate | Appropriate |
| Second Comparison Example | 6000 system Al alloy + Zinc plated steel plate + bare steel plate | No (High Current) | — | Excessive | Significant |

TABLE 1-continued

| Division | Material combination | Current change | Nugget generation state | | Thickness decrease state |
| | | | Dissimilar material interface | Same material interface | |
| --- | --- | --- | --- | --- | --- |
| First Embodiment | 6000 system Al alloy + Zinc plated steel plate + bare steel plate | Yes | Appropriate | Appropriate | Appropriate |
| Second Embodiment | 6000 system Al alloy + Zinc plated steel plate + bare steel plate (roughening of the Al alloy) | Yes | Appropriate | Appropriate | Appropriate |
| Third Embodiment | 6000 system Al alloy + Zinc plated steel plate + bare steel plate (arrangement of a seal material) | Yes | Appropriate | Appropriate | Appropriate |
| Fourth Embodiment | 6000 system Al alloy + Zinc plated steel plate + bare steel plate (applying of an alumina paste) | Yes | Appropriate | Appropriate | Appropriate |

Figure 6A:
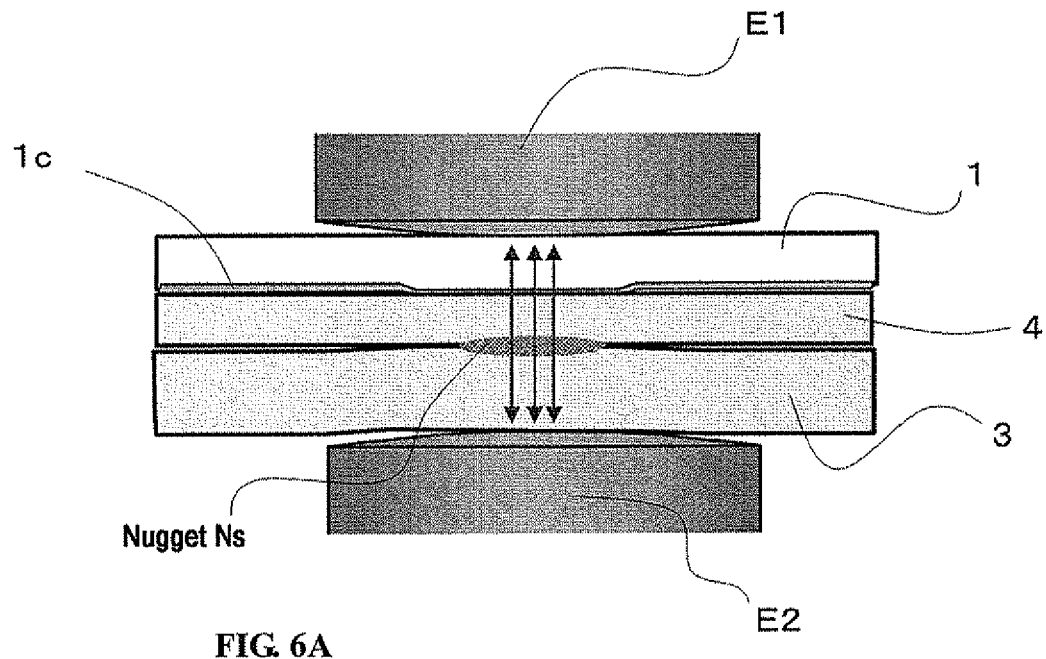
FIGS. 6A and B are cross-sectional explanatory views of a bonding process of a three-sheet bundle using a bare steel plate of a fifth embodiment.

A fifth embodiment is shown in FIG. 6A. A bonding operation of a three-sheet bundle is performed wherein a 6000 system aluminum alloy plate 1 having a thickness of 1.0 mm, a bare steel plate 4 having a thickness of 1.0 mm and a bare steel plate 3 having a thickness of 1.2 mm are layered in that order.

Figure 6B:
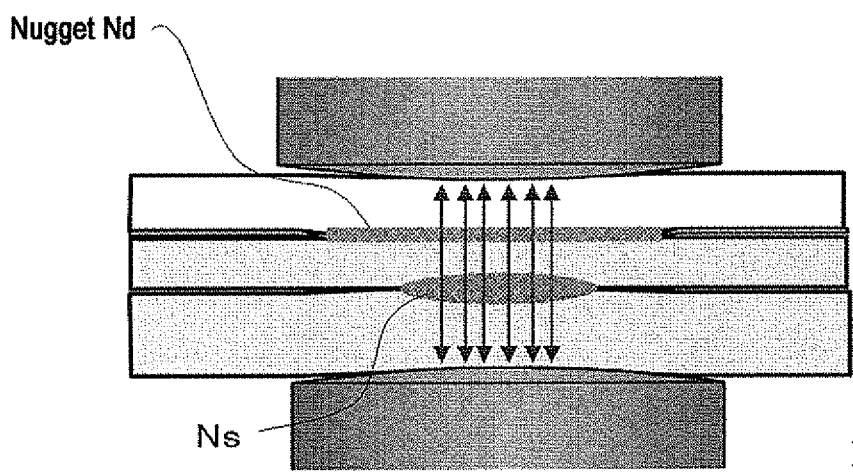

Because the same operations as in the first embodiment are repeated, a nugget Ns having a diameter Ds=5 mm is formed in the same material interface, and a nugget Nd having a diameter Dd=7 mm is formed in the dissimilar material interface as shown in FIG. 6B.

As for the steel material bonded with the aluminum alloy plate 1, the bare steel plate 4 is used instead of a zinc plated steel plate 2 in this embodiment. Consequently, eutectic fusion does not occur, and the oxide coating on the surface of the aluminum alloy plate becomes difficult to remove. Thus, oxide aluminum remains in the nugget, deteriorating the bonding strength by a small amount.

Figure 7A:
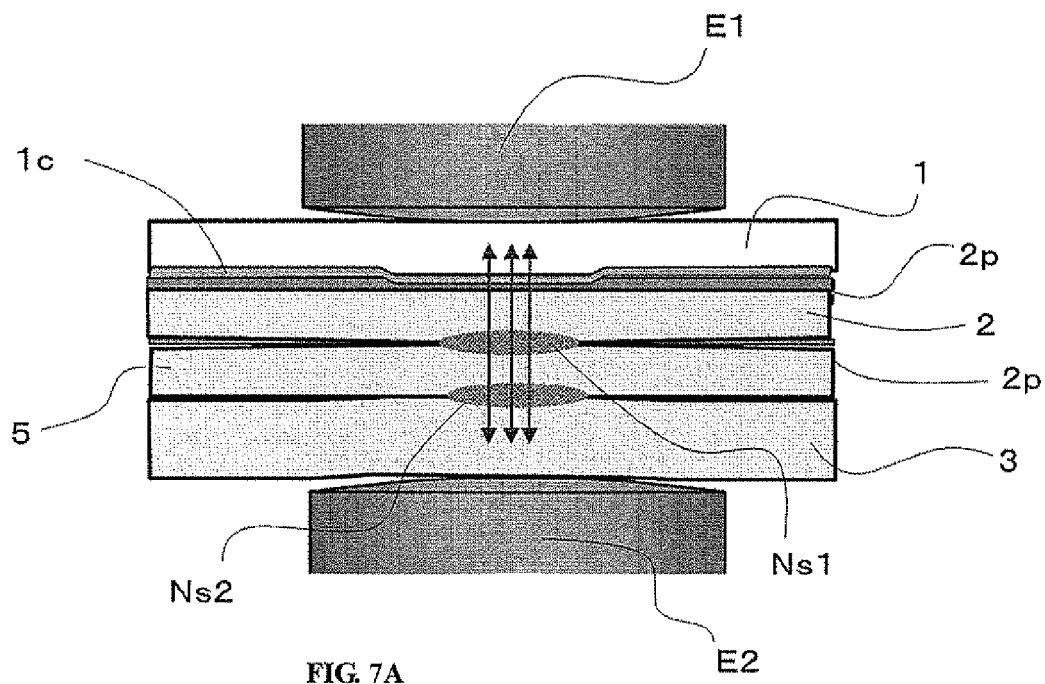
FIGS. 7A and B are cross-sectional explanatory views of a sixth embodiment of a bonding process of a four-sheet bundle.

A sixth embodiment is shown in FIG. 7A. A bonding operation of a four-sheet bundle is performed wherein a 6000 system aluminum alloy plate 1 having a thickness of 1.0 mm, a fused zinc plated steel plate 2 having a thickness of 0.8 mm, a bare steel plate 5 having a thickness of 0.8 mm and a bare steel plate 3 having a thickness of 1.2 mm are layered in that order.

An AC current of 4000 A is first conducted while exerting a pressing force of 450 kgf by using the spot welding device shown in FIG. 1B and monitoring the contact resistance of the same material interface by the monitoring device M. Here, the contact resistance monitored is that between the fused zinc plated steel plate 2 and the bare steel plate 3. As in each embodiment, when the monitored resistance value is reduced to a value of 20% of the primary contact resistance value, the AC current is increased to a value of 22000 A and then conducted for a total period of 0.16 second.

Figure 7B:
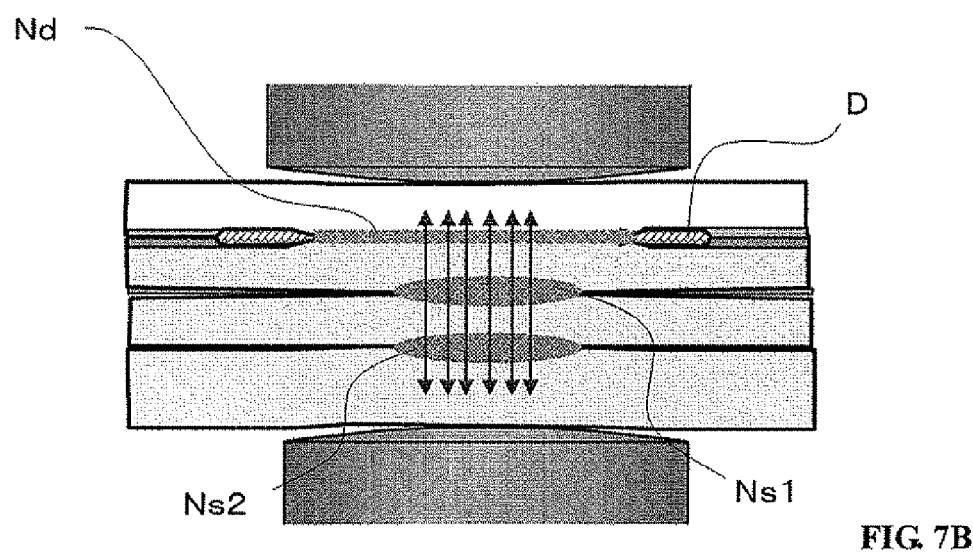

By doing so, as shown in FIG. 7B, a nugget Ns1 having a diameter Ds1=5 mm is formed in the same material interface of the zinc plated steel plate 2. Further, a nugget Ns2 having a diameter of Ds2=5 mm is formed in the same material interface of the bare steel plate 5 and the bare steel plate 3. Also, a nugget Nd having a diameter=7 mm is formed in the dissimilar material interface formed of the aluminum alloy plate 1 and the zinc plated steel plate 2.

As such, even in the case of the bonding operation of the four-sheet bundle, a favorable bonding seam can be obtained by smoothly discharging the oxide membrane of the aluminum from the bonding interface by using the zinc plated steel plate, while suppressing the thickness decrease of the aluminum alloy plate 1 and forming nuggets with the appropriate shapes and sizes in the two same material interface and dissimilar material interface.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A bonded structure of dissimilar materials made from metals, comprising:
   at least two plate layers of a steel material;
   a plate layer of a second metallic material having a melting point lower than the steel material;
   a dissimilar material interface between a plate layer of the steel material and the plate layer of the second metallic material;
   a steel material interface between adjacent plate layers of the steel material, wherein a contact resistance in the dissimilar material interface is lower than a contact resistance in the steel material interface;
   a first nugget formed in the dissimilar material interface to bond the plate layer of the steel material and the plate layer of the second metallic material, the first nugget having a first diameter Dd; and
   a second nugget formed in the steel material interface to bond the adjacent plate layers of the steel material, the second nugget having a second diameter Ds, wherein the first diameter Dd is larger than the second diameter Ds.

2. The bonded structure according to claim 1 wherein the first diameter Dd is within a range of $4.4\cdot t1 < Dd < 12\cdot t1$, with t1 being a thickness of one of the plate layers forming the dissimilar material interface that has a smaller product; and wherein the second diameter Ds is within a range of $4\sqrt{t2} < Ds < 7\sqrt{t2}$, with t2 being a thickness of one of the plate layers forming the steel material interface that has a smaller product; and
   wherein a product of a respective plate layer is defined as a strength per unit area multiplied by a thickness of the respective plate layer.

3. A vehicular component comprising the bonded structure of claim 2.

4. The bonded structure according to claim 1, wherein the second metallic material is an aluminum alloy.

5. The bonded structure according to claim 1, wherein the second metallic material is a magnesium alloy.

6. The bonded structure according to claim 1 further comprising:
   a discharge layer around at least a portion of the nugget formed in the dissimilar material interface having the first diameter Dd.

7. The bonded structure according to claim 6, wherein the discharge layer includes fusion eutectic metal.

8. The bonded structure according to claim 6, wherein the discharge layer includes oxide coating.

* * * * *